(12) United States Patent
Huschenbett (10) Patent No.: US 11,679,737 B2
(45) Date of Patent: Jun. 20, 2023

(54) ACCESS DEVICE FOR A VEHICLE

(71) Applicant: Continental Automotive GmbH, Hannover (DE)

(72) Inventor: Matthias Huschenbett, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/295,837

(22) PCT Filed: Sep. 25, 2019

(86) PCT No.: PCT/EP2019/075932
§ 371 (c)(1),
(2) Date: May 20, 2021

(87) PCT Pub. No.: WO2020/104086
PCT Pub. Date: May 28, 2020

(65) Prior Publication Data
US 2022/0009445 A1    Jan. 13, 2022

(30) Foreign Application Priority Data
Nov. 22, 2018   (DE) ...................... 10 2018 220 086.6

(51) Int. Cl.
*B60R 25/24*      (2013.01)
*B60R 25/102*     (2013.01)
(Continued)

(52) U.S. Cl.
CPC ............ *B60R 25/24* (2013.01); *B60R 25/102* (2013.01); *G08C 17/02* (2013.01); *H04L 67/12* (2013.01); *B60R 2325/205* (2013.01)

(58) Field of Classification Search
CPC . B60R 25/24; B60R 25/102; B60R 2325/205; B60R 25/40; G08C 17/02;
(Continued)

(56) References Cited

U.S. PATENT DOCUMENTS 8,935,052 B2 *  1/2015  Hermann ................ B60R 25/24
                                                        701/45
9,886,805 B1    2/2018  Bianchi, III et al.
(Continued)

FOREIGN PATENT DOCUMENTS

DE   102011106888 A1    5/2012
DE   102011056499 A1    6/2012
(Continued)

OTHER PUBLICATIONS

Office Action dated Jul. 11, 2019 from corresponding German Patent Application No. DE 10 2018 220 086.6.
(Continued)

*Primary Examiner* — Adnan Aziz (57) ABSTRACT

Disclosed is an access device of a vehicle having an on-vehicle control device configured to transmit enquiry signals to a mobile identification transmitter to determine the state of motion thereof, and adapt the transmission of the enquiry signals for a response signal received from the mobile identification transmitter containing the state of motion of the mobile identification transmitter, or on the basis of the absence of the response signal. Energy is saved in the event of a response signal containing a communicated stationary state of the mobile identification transmitter or in the absence of a response signal by reducing the frequency of the transmission of the enquiry signals.

15 Claims, 5 Drawing Sheets

(51) Int. Cl.
*G08C 17/02* (2006.01)
*H04L 29/08* (2006.01)
*H04L 67/12* (2022.01)

(58) Field of Classification Search
CPC ............ H04L 67/12; G07C 2009/0096; G07C 2209/63; G07C 9/00309
See application file for complete search history.

(56) References Cited

U.S. PATENT DOCUMENTS

| | | | | |
|---|---|---|---|---|
| 2005/0258936 A1* | 11/2005 | Ghabra | ................ | B60R 25/245 340/5.72 |
| 2008/0061932 A1* | 3/2008 | Hermann | ................ | B60R 25/24 340/5.72 |
| 2011/0298580 A1* | 12/2011 | Nakashima | ............. | B60R 25/24 340/3.1 |
| 2012/0158244 A1 | 6/2012 | Talty et al. | | |
| 2013/0176069 A1 | 7/2013 | Leong et al. | | |
| 2014/0232322 A1 | 8/2014 | Kracker et al. | | |
| 2014/0308971 A1* | 10/2014 | O'Brien | ................ | H04W 4/023 455/456.1 |
| 2015/0161834 A1* | 6/2015 | Spahl | ................ | G07C 9/28 340/5.61 |
| 2015/0248801 A1* | 9/2015 | Froitzheim | ........... | B60R 25/406 340/5.61 |
| 2016/0171803 A1* | 6/2016 | Müller | ................ | B60L 53/126 340/5.61 |
| 2017/0050618 A1* | 2/2017 | Lickfelt | ................ | B60R 25/403 |
| 2018/0186332 A1 | 7/2018 | Bocca et al. | | |
| 2018/0208155 A1 | 7/2018 | Beyer et al. | | |
| 2020/0066078 A1 | 2/2020 | Huschenbett | | |
| 2020/0245111 A1 | 7/2020 | Heininger et al. | | |

FOREIGN PATENT DOCUMENTS

| | | |
|---|---|---|
| DE | 102011001226 A1 | 9/2012 |
| DE | 102011013605 A1 | 9/2012 |
| DE | 102016223252 A1 | 5/2018 |
| DE | 102016225284 A1 | 6/2018 |
| DE | 102017128924 A1 | 6/2018 |
| DE | 102017201087 A1 | 7/2018 |
| DE | 102017103233 A1 | 8/2018 |
| EP | 0984124 A2 | 3/2000 |
| EP | 2612795 A1 | 7/2013 |
| WO | 2019072897 A1 | 4/2019 |

OTHER PUBLICATIONS

International Search Report and Written Opinion dated Jan. 21, 2020 from corresponding International Patent Application No. PCT/EP2019/075932.

* cited by examiner

ACCESS DEVICE FOR A VEHICLE

The present invention concerns an access device for a vehicle and a vehicle having such an access device. Furthermore, it concerns a method for operating an access device for a vehicle.

In order to prevent unauthorized entry to a vehicle, in particular motor vehicle, modern access authorization systems or access devices in vehicles use electronic security systems in which, in order to authenticate the user, a data communication takes place between a first communication device of the vehicle and a second communication device in a mobile identification transmitter of the user, such as a key or key fob. In this case, the mobile identification transmitter for an active access device transmits control signals and an identification code to the vehicle, for example as a result of an appropriate key being pressed by the user of the mobile identification transmitter, after which the vehicle is unlocked or locked if the identification code is correct.

In the case of a so-called passive access device, a first communication device of the vehicle firstly transmits enquiry signals or localization signals having a specific field strength at predetermined regular intervals of time in order to check whether there is a mobile identification transmitter in an approach region around the vehicle. If a mobile identification transmitter approaches the vehicle and can finally receive the enquiry signals thereof, it will respond to the reception of an enquiry signal in order to initiate an authentication process, and if appropriate in order to be able to determine the position of the mobile identification transmitter relative to the vehicle. For authentication, data telegrams are exchanged in which the mobile identification transmitter ultimately communicates its authentication code to the vehicle. If the authentication code is checked successfully, it is then possible for a user situated directly at the vehicle to initiate unlocking of the applicable vehicle door or of all the vehicle doors by operating a door handle. Since this requires no active operation of a mechanical or electrical identification transmitter or key to be performed by a user, this type of access authorization is also referred to as a passive access authorization check, and the corresponding access devices are referred to as passive electronic access devices.

A disadvantage of such passive access devices is that a regular check on the presence of the mobile identification transmitter close to the vehicle and possibly also on the exact position of the mobile identification transmitter relative to the vehicle usually involves the enquiry signals or localization signals being transmitted at short intervals of time, i.e. at a high rate, so as to always ensure the presence detection or accurate position determination and thus smooth operation of the passive access device. However, this firstly leads to a high power consumption in the vehicle for the transmission of the enquiry signals or localization signals, and also in the mobile identification transmitter when processing the received signals and when transmitting response signals.

The object of the present invention is therefore to provide a possible way of ensuring reliable operation of an access device with minimized power consumption.

This object is achieved by the subjects of the independent claims. Advantageous refinements are the subject of the dependent claims.

According to a first aspect of the invention, an access device for a vehicle is provided, having the following features: The access device has an on-vehicle control device for transmitting enquiry signals to a mobile identification transmitter in order to determine the state of motion thereof. Further, the on-vehicle control device is configured to adapt the transmission of the enquiry signals for a response from the mobile identification transmitter containing the state of motion thereof or the absence of the response. For example, the frequency of the transmission of the enquiry signals can be adapted in accordance with the received state of motion. In particular, the frequency can be reduced when a stationary state has been received as the state of motion of the mobile identification transmitter. However, it is also conceivable, in addition or as an alternative to adapting the frequency of the transmission of the enquiry signals, to adapt a data content or a signal duration of the enquiry signals (in particular to reduce the data content or the signal duration when the mobile identification transmitter is in a stationary state of motion).

This control of the transmission of the enquiry signals on the basis of the received state of motion of the mobile identification transmitter means that the transmission of the enquiry signals does not have to take place at a constant and high rate, but can be operated depending on the situation. This allows the power consumption both in the vehicle and in the identification transmitter to be reduced without having to accept any losses in respect of the performance capability of the access device.

According to one refinement of the invention, the access device can further have a mobile identification transmitter that comprises an identification-transmitter transmitting/receiving device for receiving the vehicle's enquiry signals and for transmitting a response signal containing the state of motion of the mobile identification transmitter in response to at least one enquiry signal.

According to another refinement of the invention, the mobile identification transmitter can further have an identification-transmitter control device for controlling the transmission of the response signals (e.g. the integration of the state of motion into the response signal, etc.).

According to another refinement of the invention, the identification-transmitter control device can be configured to enable the transmission of the response signal only when a specific state of motion exists. In particular, it can enable the transmission of the response signal when the mobile identification transmitter is in a moving state. Thus, as mentioned above, the on-vehicle control device can then adapt the transmission of the enquiry signals for the absence of the response (for example by changing the frequency for transmitting the enquiry signals). This allows the power consumption in the mobile identification transmitter to be lowered further, since the latter no longer has to respond to every enquiry signal. In addition, the security of the access device can be increased in this way, since a mobile identification transmitter carried by a user is usually moved when the user goes to his vehicle and comes within range of the enquiry signals of the vehicle within a specific distance. If the user is sitting in a restaurant, for example, then the mobile identification transmitter will be stationary or assume a stationary state of motion in which it does not transmit any response signals. An on-vehicle control device that does not receive any response signals will accordingly not perform any in particular security-relevant vehicle functions, such as the unlocking of a vehicle door. A relay attack can therefore be prevented.

The on-vehicle control device can adapt the frequency of the transmission of the enquiry signals in accordance with the above-described case of reception of a response from the mobile identification transmitter containing the state of motion thereof or in the absence of the response signal. In particular, the frequency can be reduced if no response signal has been received from the mobile identification transmitter for a single enquiry signal or a specific number of enquiry signals. However, it is also conceivable, in addition or as an alternative to adapting the frequency of the transmission of the enquiry signals, to adapt a data content or a signal duration of the enquiry signals (in particular to reduce the data content or the signal duration in the absence of a response signal from the mobile identification transmitter). In this way, the vehicle saves energy, and heating of the on-vehicle control device or of an on-vehicle transmitting device assigned thereto is prevented.

According to another refinement of the invention, the on-vehicle control device can be configured to transmit (or to prompt transmission) to the mobile identification transmitter an enquiry signal, containing a request, at any one time or after a specific time interval has elapsed after a specific state of motion of the mobile identification transmitter has been recognized, which enquiry signal forces the mobile identification transmitter to return a response signal in any event. In particular when the mobile identification transmitter is in a stationary state, in which it does not transmit a response signal, in order to save power, such a request can be used to ensure that the on-vehicle control device checks whether the mobile identification transmitter is still close to the vehicle, and if appropriate to also ascertain the exact position of said mobile identification transmitter relative to the vehicle. This allows the security and reliability of the access device to be increased.

According to another refinement of the invention, the mobile identification transmitter can further have a motion sensor for detecting a movement of the mobile identification transmitter. In particular, the motion sensor can be in the form of an acceleration sensor that is configured to detect an acceleration (and thus a movement) of the mobile identification transmitter.

According to another refinement of the invention, the identification-transmitter control device can further be connected to the motion sensor. In particular, the identification-transmitter control device recognizes the state of motion to be a stationary state of the mobile identification transmitter when the movement (or acceleration) detected (by the motion sensor) is below a predetermined threshold value. Further, it can recognize the state of motion to be a moving state of the mobile identification transmitter when the movement or acceleration detected (by the motion sensor) is above a predetermined threshold value.

According to another refinement of the invention, the mobile identification transmitter can further have an identification-transmitter timing device for recording the time since a last predetermined movement of the mobile identification transmitter with a movement value or acceleration value above a predetermined threshold value.

According to another refinement of the invention, the identification-transmitter control device can further be configured to recognize the state of motion of the mobile identification transmitter as a moving state when the motion or acceleration detected by the motion sensor is above a predetermined threshold value and the time measured by the identification-transmitter timing device is within a predetermined time interval. The predetermined time interval can be for example 10 to 30 seconds between the predetermined movement and reception of the enquiry signal.

According to another refinement of the invention, the on-vehicle control device can further be configured to increase the frequency of the transmission of the enquiry signals again when, after a response containing a stationary state has been received as the state of motion of the mobile identification transmitter, a response containing a moving state has been received again. The same applies if, after a response from the mobile identification transmitter has been absent, a response was received again after a specific number of enquiry signals were transmitted. In addition or as an alternative to increasing the frequency of the transmission of the enquiry signals, it is also possible to increase the data content or the signal duration again if the conditions just described are satisfied.

According to another refinement of the invention, the mobile identification transmitter can directly or automatically transmit a notification signal when it changes from a stationary to a moving state (or, in other words, when the identification-transmitter control device has recognized first a stationary and then a moving state). In this way, the on-vehicle control device can again be quickly informed of the new state of motion (a movement) of the mobile identification transmitter and adapt the transmission of the enquiry signals.

According to another refinement of the invention, the on-vehicle control device can further be designed to authenticate the mobile identification transmitter with respect to the vehicle. For this purpose, it is used to transmit at least one enquiry signal containing a request for an identification code to the mobile identification transmitter, and to receive the identification code from the identification transmitter. If the identification code transmitted by the mobile identification transmitter corresponds to a specified code stored in the vehicle or in the on-vehicle control device, the mobile identification transmitter is identified as being correct.

According to another refinement of the invention, the on-vehicle control device can transmit signals for determining the position of the mobile identification transmitter in the form of the enquiry signals or as separate localization signals. When using separate localization signals, it is conceivable for the frequency of the transmission of these localization signals to also be adapted in accordance with the state of motion of the mobile identification transmitter, in accordance with the frequency of the enquiry signals. It is conceivable for the above-described correct identification of the mobile identification transmitter on the vehicle to be used to ensure that the transmission of localization signals or the adaptation of the frequency of the transmission of the localization signals happens only if a correct mobile identification transmitter has been detected beforehand.

According to another refinement of the invention, it is conceivable for the on-vehicle control device to transmit localization signals for position determination only when a moving state of the mobile identification transmitter is recognized (or, in other words, when the detected movement or acceleration is above a predetermined threshold value). On the other hand, when the mobile identification transmitter is in the stationary state (when the detected movement or acceleration is below a predetermined threshold value), only a "presence polling" (polling: the regular transmission of enquiry signals) can take place, which involves the presence of a mobile identification transmitter and the state of motion thereof being polled. A polling strategy selected in this way can in turn save power, in particular for the on-vehicle control device.

According to another refinement of the invention, the on-vehicle control device is further configured to trigger a predetermined vehicle function on the basis of the reception of a moving state of the mobile identification transmitter or the position of the mobile identification transmitter relative to the vehicle or the reception of a valid identification code of the mobile identification transmitter, or if a specific combination of said criteria exists. Such vehicle functions in this case can be "welcome lighting", which causes a lighting device of the vehicle to be activated if a user has approached the vehicle with the mobile identification transmitter and is situated at a specific distance, or less, relative to the vehicle. They can further be a so-called "approach unlock" function (automatic unlocking on approach), wherein a to the mobile identification transmitter or to the user carrying it will automatically unlock the nearest door on an approach. Finally, it is also conceivable for such a vehicle function to comprise so-called "walk-away locking", which involves the vehicle or the doors thereof being locked automatically if a user with his identification transmitter moves away from the vehicle by further than a predetermined distance.

According to another refinement, the mobile identification transmitter can be an electronic vehicle key. However, it is also conceivable for the mobile identification transmitter to be in the form of a mobile phone, in particular in the form of a smartphone.

According to a second aspect of the invention, a vehicle comprising an access device according to the depiction above or a refinement thereof is provided.

Finally, according to a third aspect, a method for operating an access device for a vehicle is provided, having the following steps: enquiry signals are transmitted to a mobile identification transmitter to determine the state of motion thereof. Further, the transmission of the enquiry signals is adapted for a response signal from the mobile identification transmitter containing the state of motion of the mobile identification transmitter, or on the basis of the reception or absence of the response signal. This provides a possible way of reducing the power consumption of an access device without forfeit for reliable operation.

Advantageous refinements of the access device, in so far as applicable to the vehicle and the method, can also be regarded as advantageous refinements of the vehicle and of the method, and vice versa.

Illustrative embodiments of the present invention will now be explained in more detail below with reference to the accompanying drawings,
in which.

Figure 1:
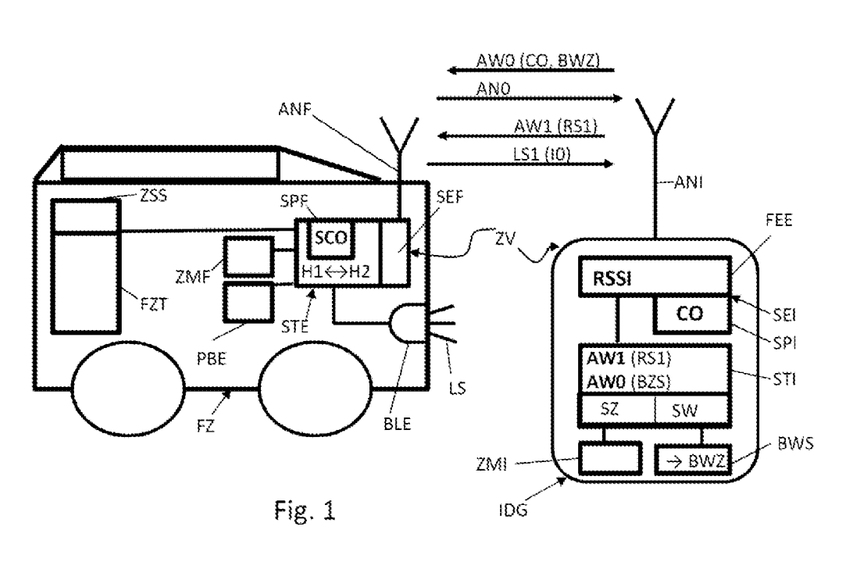
FIG. 1 shows a schematic depiction of a vehicle with an access device according to one embodiment of the invention.

Reference will first be made to FIG. 1, which shows a vehicle FZ with an access device ZV according to one embodiment of the invention. The vehicle FZ has a vehicle door FZT, which can be unlocked or locked by means of a central locking system ZSS. Furthermore, the vehicle FZ comprises on-vehicle components of the access device ZV. First, these are an on-vehicle control device STE. This has an on-vehicle transmitting/receiving device SEF, which is configured to transmit radio signals to a mobile identification transmitter IDG and to receive response signals therefrom. The mobile identification transmitter can be in the form of an electronic vehicle key or a smartphone. For transmitting and receiving, the on-vehicle control device STE or the on-vehicle transmitting/receiving device SEF thereof is connected to an on-vehicle antenna ANF, which can also have multiple partial antennas. The on-vehicle transmitting/receiving device SEF can use the antenna ANF to transmit for example a low-frequency enquiry signal ANO (e.g. at approximately 125 kHz) to the identification transmitter IDG, which responds thereto with a response signal AWO, which can further contain an identification code CO of the identification transmitter IDG. The response signal AWO can be a radio-frequency signal (e.g. at approximately 433 MHz).

It is further conceivable for the communication or the exchange of the signals described to also be able to take place using a different radio standard, such as for example in accordance with a Bluetooth standard, in particular "Bluetooth Low Energy" (BLE), or else in accordance with a WLAN standard (wireless local area network). Communication by means of an exchange of UWB (ultra-wideband) signals is also conceivable.

In addition to the signals just mentioned for an authentication process, other signals for determining the position of the identification transmitter IDG relative to the vehicle FZ can be exchanged between the vehicle FZ and the identification transmitter IDG. The control device STE can use the antenna ANF to transmit one or more low-frequency localization signals LS1, the field strength of which is measured at the location of the identification transmitter and is returned from the identification transmitter to the vehicle in the form of a field strength value RS1 using a corresponding response signal AW1. Based on the fact that the received field strength of a localization signal decreases as distance increases, the field strength value RS1 which is transmitted with the response signal AW1 can be a measure of the distance between the identification transmitter IDG and the vehicle.

While the communication of a single antenna ANF with the identification transmitter IDG makes it possible to determine a distance between the identification transmitter IDG and this antenna, it is further conceivable to permit more accurate determination of the position of the identification transmitter IDG relative to the vehicle FZ by using, in addition to the antenna ANF, a further on-vehicle antenna to transmit localization signals. The location of the identification transmitter can then be determined more accurately by means of an appropriate triangulation method. One or even multiple additional antennas for improved position determination are certainly conceivable, but not depicted in FIG. 1 for reasons of clarity.

It will be noted that in the above depiction a received field strength measurement on the mobile identification transmitter for low-frequency (or radio-frequency or also Bluetooth) localization signals, emitted by the on-vehicle antennas, has been carried out for position determination between on-vehicle antennas and the mobile identification transmitter. However, it is also conceivable to carry out position determination between on-vehicle antennas and the mobile identification transmitter on the basis of propagation time measurements, such as e.g. by means of radio-based UWB (ultra-wideband) transmissions. For this purpose, the on-vehicle control device STE or the transmitting/receiving device SEF thereof has one or more appropriate UWB transmitting/receiving devices, to which respective UWB antennas are assigned, instead of the aforementioned antennas for transmitting low-frequency (or radio-frequency or Bluetooth) localization signals. For position determination with reference to the antennas, which are provided at different positions on the vehicle FZ depending on the application, the respective antennas transmit UWB signals (short UWB pulses) to the mobile identification transmitter IDG, which are received by the mobile identification transmitter IDG and transmitted back again to the UWB antennas or the assigned UWB transmitting/receiving devices thereof. The propagation time required for covering the distance between the vehicle or the UWB antennas and the mobile identification transmitter is thus measured in the respective UWB transmitting/receiving devices, as a result of which the respective distance or the relative position of the mobile identification transmitter IDG with respect to the UWB antenna(s) can be ascertained on the basis thereof. An authentication process can also be carried out in addition to the position determination by means of UWB.

The on-vehicle control device STE is further connected to the central locking system ZSS, as a result of which the control device STE can unlock or lock the vehicle door FZT via the central locking system ZSS. One prerequisite for unlocking is that the identification code CO transmitted to the vehicle by the identification transmitter IDG matches a specified code SCO stored in the on-vehicle control device STE (or a memory device SPF assigned thereto). In this case, the identification transmitter IDG is considered to be the correct identification transmitter, as a result of which a user carrying this identification transmitter can enter the vehicle interior or the passenger compartment with the correct identification transmitter. Another (additional) prerequisite for unlocking of the vehicle door FZT can be that the identification transmitter IDG is further situated at the correct position relative to the vehicle or within a specific distance around the vehicle. In other words, it is conceivable for a vehicle door FZT to be able to be unlocked by the control device STE for example only when the identification transmitter IDG is situated within a predetermined distance around the vehicle or within a predetermined distance relative to a vehicle door. Another (additional) prerequisite for unlocking of the vehicle door FZT can be that the mobile identification transmitter IDG is in a moving state.

It is further conceivable for automatic unlocking of the vehicle door FZT also to occur only when, firstly, the identification code CO was registered as correct and, further, the direction of movement runs in the direction of the vehicle FZ. The criterion of a moving state of the mobile identification transmitter would already be implicitly regarded as recognized if a direction of movement were detected.

For position determination, the on-vehicle control device STE is connected to an on-vehicle position determination device PBE that receives from the on-vehicle control device STE the field strength values RS1, received via one or more vehicle antennas ANF, of an identification transmitter IDG and can infer the position of the mobile identification transmitter IDG therefrom through knowledge of the mounting location of the one or more antennas on the vehicle.

For the mobile identification transmitter IDG to communicate with the vehicle FZ, the mobile identification transmitter IDG has an identification-transmitter transmitting/receiving device SEI with a field strength detection device FEE, which uses an identification-transmitter antenna ANI to receive the applicable localization signals LS1 (and also enquiry signals ANO), the field strength detection device FEE determining the respective field strength value RSSI from the localization signals LS1 and forwarding it to the identification-transmitter control device STI. The latter generates a response signal AW1 therefrom that contains a value corresponding to the detected field strength or a value RS1 derived therefrom. As mentioned above, this response signal AW1 is then returned to the vehicle, for example as a radio-frequency signal, via the identification-transmitter antenna ANI.

As further mentioned above, the identification transmitter IDG receives, for an authentication with respect to the vehicle, an enquiry signal ANO, in response to which the identification-transmitter control device STI fetches the identification code CO from a memory SPI and in turn returns it, in particular as a radio-frequency signal, to the vehicle FZ in the response signal AWO.

By transmitting the enquiry signals ANO, the on-vehicle control device STE can further poll the state of motion of the mobile identification transmitter. This can be done by regularly transmitting the enquiry signals ANO at a first predetermined rate or frequency H1. For this purpose, the enquiry signals ANO can contain an applicable request. As will be explained in more detail below, the on-vehicle control device STE can further be configured to adapt the transmission of the enquiry signals for a response from the mobile identification transmitter containing the state of motion thereof. Accordingly, it is also possible to adapt the transmission of the enquiry signals for the absence of the response from the mobile identification transmitter.

According to a first variant, the identification-transmitter control device STI is designed to control the transmission of the response signals, such as to integrate the state of motion BWZ into the response signal ANO. For this purpose, the identification-transmitter control device STI is connected to an identification-transmitter motion sensor BWS for detecting a movement or state of motion BWZ of the mobile identification transmitter. The identification-transmitter control device recognizes the state of motion BWZ to be a stationary state of the mobile identification transmitter IDG when the detected movement is below a predetermined threshold value SW, and recognizes the state of motion BWZ to be a moving state of the mobile identification transmitter when the detected movement is above the predetermined threshold value SW.

If the mobile identification transmitter IDG returns a response signal AW0 containing a state of motion BWZ, in particular in response to an enquiry signal, the on-vehicle control device STE checks which state of motion reported back is involved. If the identification transmitter IDG is in a "moving state", the frequency of the transmission of the enquiry signals AN0 is maintained. If, on the other hand, a "stationary state" is received as the state of motion BZW of the mobile identification transmitter, the on-vehicle control device STE will reduce the frequency of the transmission of the enquiry signals AN0 to a second frequency H2, which is decreased in relation to the first frequency. If the identification transmitter is in a stationary state, it is not expected to be carried to the vehicle by a user immediately (in order to carry out or complete an authentication or so that the user enters the vehicle). As a result, by reducing the frequency of the transmission of the enquiry signals ANO, power is saved firstly on the vehicle and, secondly, also on the mobile identification transmitter, since the latter no longer has to respond as often.

In addition to the functions of the first variant, the identification-transmitter control device STI according to a second variant has further functions for controlling the transmission of the response signals. In addition to integrating the state of motion BWZ into the response signal, the identification-transmitter control device STI is designed to enable the transmission of a response signal AW0 only when a certain state of motion BWZ exists. In particular, it can enable the transmission of the response signal when the mobile identification transmitter is in a moving state. This allows the power consumption in the mobile identification transmitter to be lowered further, since the latter no longer has to respond to every enquiry signal.

According to a third variant, the mobile identification transmitter IDG can further have an identification-transmitter timing device ZMI for recording the time since a last predetermined movement of the mobile identification transmitter IDG with a movement value or acceleration value above a predetermined threshold value SZ. Accordingly, the identification-transmitter control device can further be configured to recognize the state of motion BWZ of the mobile identification transmitter IDG as a moving state if the movement or acceleration detected by the motion sensor BMS is above the predetermined threshold value and the time measured by the identification-transmitter timing device is within a predetermined time interval.

The depiction of the essential components of an access device (also with possible variants) will now be followed below by a depiction of embodiments for controlling the transmission of enquiry signals on the basis of the movement of the mobile identification transmitter IDG.

Figure 2:
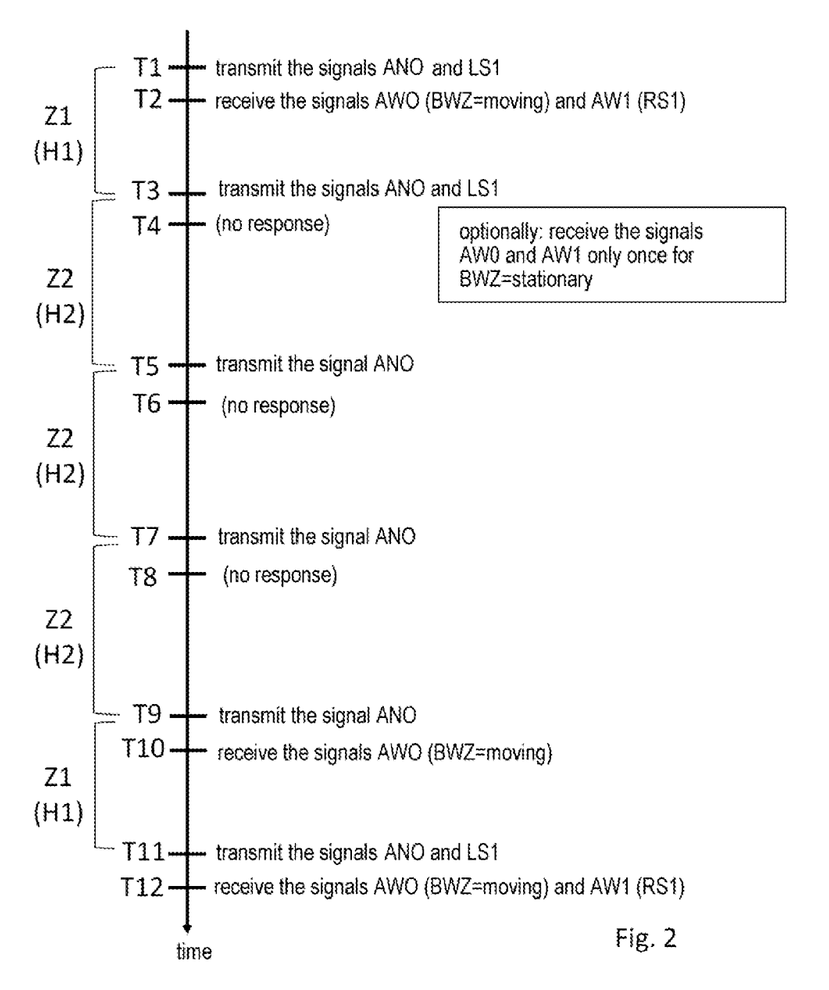
FIG. 2 shows a flowchart to illustrate the control of the transmission of enquiry signals on the basis of the movement of the mobile identification transmitter according to a first embodiment.

FIG. 2 shows a first flowchart to illustrate the control of the transmission of enquiry or localization signals according to a first embodiment. A timeline herein runs from top to bottom in the figure, the corresponding events being shown from the point of view of the on-vehicle control device STE (or the on-vehicle transmitting/receiving device SEF thereof). Starting from top to bottom, a respective enquiry signal ANO and a localization signal LS1 are transmitted by the on-vehicle transmitting/receiving device SEF in a first step at a time T1. In a second step, these signals are received and evaluated by the mobile identification transmitter IDG, which is currently in motion. Accordingly, the mobile identification transmitter IDG returns respective response signals AWO containing the information about a moving state of the mobile identification transmitter and a response signal AW1 for the localization signal containing information about the field strength RS1 measured at the location of the mobile identification transmitter. These signals are then received by the on-vehicle transmitting/receiving device SEF in a third step at the time T2.

While a mobile identification transmitter IDG is in the moving state and for as long as the on-vehicle transmitting/receiving device SEF receives response signals AW0 and AW1 from the mobile identification transmitter IDG for corresponding enquiry ANO or localization LS1 signals, the on-vehicle control device STE sets a time interval Z1 for the next transmission of a further enquiry signal or localization signal. This time interval Z1, for example of approximately 250 milliseconds, corresponds to a first rate or frequency A1 (signals per second). The time interval Z1 and further time intervals (for example the time interval Z2) can be measured using an on-vehicle timing device ZMF.

Thus, after the time interval Z1 has elapsed, from the time T1, a respective enquiry signal ANO and a localization signal LS1 are in turn transmitted in a fourth step at the time T3. In a fifth step, these signals are received and processed by the mobile identification transmitter IDG, which is then stationary. According to this first embodiment, the identification-transmitter control device STE is designed such that, when the identification transmitter IDG is in a stationary state, it does not enable the identification-transmitter transmitting/receiving device SEI to transmit a respective response signal AW0 or AW1. Thus, the on-vehicle transmitting/receiving device SEF awaits response signals in a sixth step at the time T4, but no response signals are received by the vehicle. As a result of the transmission of response signals being prevented when the identification transmitter IDG is in the stationary state, the identification transmitter can thus save power.

Due to the fact that the on-vehicle transmitting/receiving device SEF did not receive a response signal at the time T4, the on-vehicle control device STE will then set the time interval for the next transmission of an enquiry signal to the time interval Z2, which is longer than the time interval Z1. For example it can be 1 to 2 seconds. Accordingly, the frequency H2 of the transmission of signals by the on-vehicle transmitting/receiving device SEF thus changes to a lower value.

Thus, in a seventh step at a time T5, the on-vehicle transmitting/receiving device SEF transmits a next enquiry signal ANO. According to this embodiment, when the mobile identification transmitter is in the stationary state, transmission of a localization signal LS1 is further dispensed with, since the mobile identification transmitter IDG does not move in the stationary state and has not changed its location since the last position determination. This saves power for the vehicle not only as a result of the decreased frequency (H2) of the transmission of enquiry signals, but also as a result of the transmission of localization signals being dispensed with (and thus as a result of the shortening of the transmission period). Since the mobile identification transmitter IDG is still stationary and the identification-transmitter control device STI also establishes this in an eighth step, the identification transmitter IDG will not transmit a response signal. In a ninth step at a time T6, the on-vehicle transmitting/receiving device SEF awaits a response signal, but no response signal is received by the vehicle.

Since the mobile identification transmitter IDG is still stationary in the example, more or less steps seven to nine just mentioned are repeated at the times T7 and T8.

In a tenth step at the time T9 after a further second time interval Z2 has elapsed after the last enquiry signal ANO has been transmitted, an enquiry signal ANO is in turn transmitted by the on-vehicle transmitting/receiving device SEF. This enquiry signal is received in an eleventh step by the mobile identification transmitter IDG, which is then in a moving state again. Accordingly, the identification-transmitter control device STI will incorporate information BWZ about the moving state of the identification transmitter into the applicable response signal AW0 and prompt the transmission of this response AWO. Consequently, the on-vehicle transmitting/receiving device SEF receives the response signal AW0 containing the information about the moving state of the mobile identification transmitter in a twelfth step at the time T10.

In a thirteenth step, the on-vehicle control device STE subsequently again increases the frequency of the transmission of the enquiry signals to the value H1, as a result of which, from the time T9 after a time interval Z1, first an enquiry signal ANO and then again (based on the movement of the mobile identification transmitter) a localization signal LS1 are transmitted in a fourteenth step at the time T11. As above with the signals at the time T1, the two signals are, here too, again received and evaluated by the mobile identification transmitter IDG in a fifteenth step, and an applicable response signal AW0 and AW1 is returned. The response signals are received and evaluated by the on-vehicle transmitting/receiving device SEF in a sixteenth step at a time T12. This control of the transmission of the enquiry signals or localization signals on the basis of the movement of the mobile identification transmitter IDG allows the frequency to be optimally adapted in accordance with the movement, and thus allows power to be saved, both for the vehicle FZ and for the mobile identification transmitter IDG.

It will be noted that it is possible to define the time T11 for the re-transmission of enquiry or localization signals not only after a time interval Z1 from the time T9 of the last transmission of an enquiry signal ANO, as shown in FIG. 2, but rather immediately directly after reception and evaluation of the response signal AW0 at the time T10. In this way, a localization of the mobile identification transmitter IDG that begins quickly, and thus improved reliability of the access device, can be achieved again.

Figure 3:
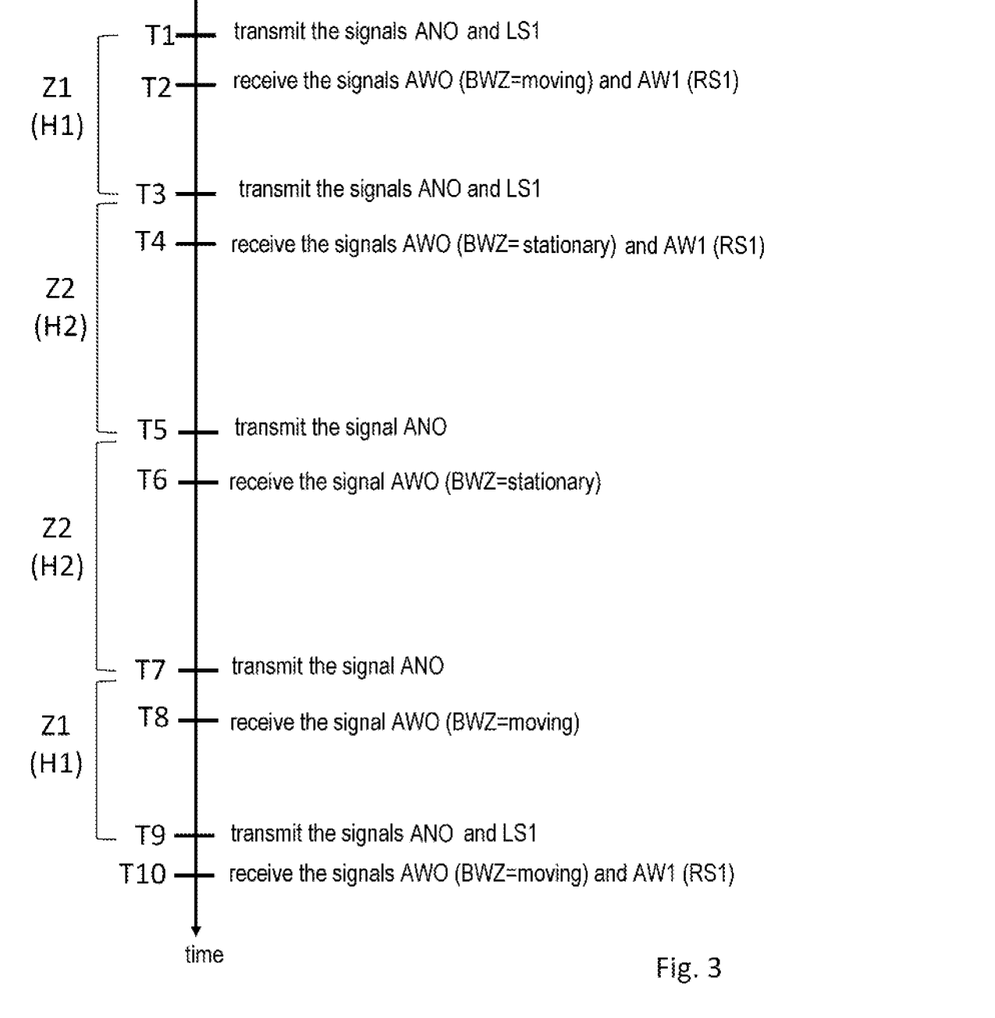
FIG. 3 shows a flowchart to illustrate the control of the transmission of enquiry signals on the basis of the movement of the mobile identification transmitter according to a second embodiment.

Reference will now be made to FIG. 3, which shows another flowchart to illustrate the control of the transmission of enquiry or localization signals according to a second embodiment. The first two embodiments are similar and differ essentially in steps five and six or eight and nine. In other words, the identification-transmitter control device STI in this second embodiment is designed in such a way that it does not prevent the transmission of the response signals AW0 or AW1 when the identification transmitter is determined to be in a stationary state, but rather now always enables it. For this purpose, it integrates a state of motion or else, if required, a measured field strength value into the respective response signal, as explained above.

That means, in a modified step five according to the second embodiment, the mobile identification transmitter transmits both a response signal AW0 containing information BWZ regarding a stationary mobile identification transmitter IDG and a response signal AW1 containing the measured field strength value RS1. Accordingly, the on-vehicle transmitting/receiving device SEF receives the response signals in a modified step six at the time T4. The on-vehicle control device STE then definitely knows the stationary state of the mobile identification transmitter IDG, adapts the frequency of the transmission of signals and will accordingly also refrain from transmitting localization signals LS1 while the mobile identification transmitter IDG is in a stationary state.

Accordingly, in a modified step eight, the mobile identification transmitter will integrate information BWZ regarding a stationary state of the mobile identification transmitter IDG into a response signal AW0 and return it to the vehicle FZ. There, the on-vehicle transmitting/receiving device SEF receives the response signal in a modified step nine at the time T6.

In this embodiment too, the appropriate control of the transmission of the enquiry signals or localization signals on the basis of the movement of the mobile identification transmitter IDG allows the frequency to be optimally adapted in accordance with the movement, and thus allows power to be saved.

It will also be noted in regard to FIG. 3 that it is possible to define the time T9 for the re-transmission of enquiry or localization signals not only after a time interval Z1 from the time T7 of the last transmission of an enquiry signal ANO, as shown in FIG. 3, but rather immediately directly after reception and evaluation of the response signal AW0 at the time T8. In this way, a localization of the mobile identification transmitter IDG that begins quickly can be achieved again.

Figure 4:
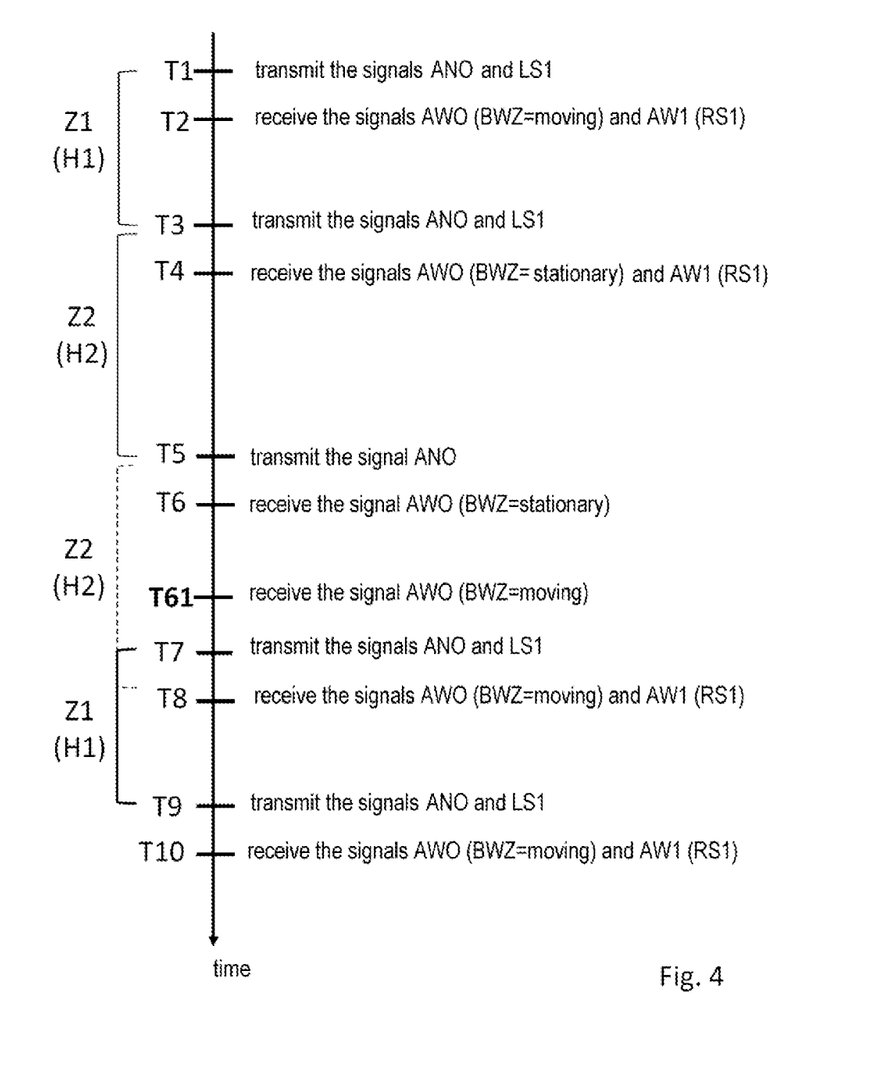
FIG. 4 shows a flowchart to illustrate the control of the transmission of enquiry signals on the basis of the movement of the mobile identification transmitter according to a third embodiment.

Reference will now be made to FIG. 4, which shows another flowchart to illustrate the control of the transmission of enquiry or localization signals according to a third embodiment. The steps in this third embodiment are essentially the same as those of the second embodiment. In particular, there is a new step at the time T61 here. In this regard, the identification-transmitter control device STI is configured to automatically transmit a signal (corresponding to a response signal AWO, but without a trigger as a result of a received enquiry signal) in the event of a specific recognized movement of the mobile identification transmitter IDG or on recognition of a moving state of the mobile identification transmitter IDG after a stationary state of the mobile identification transmitter IDG was recognized previously, in which signal the predetermined movement or the moving state of the mobile identification transmitter IDG is indicated. At the time T61, the on-vehicle transmitting/receiving device SEF receives the signal AWO containing the message. The on-vehicle control device STE will immediately analyze the new state of motion of the mobile identification transmitter and prompt the transmission of an enquiry signal ANO and a localization signal LS1 before the second time interval Z2 has elapsed (hence the dashed representation of the applicable parentheses). In this way, the mode of the transmission of the enquiry or localization signals can be quickly adapted for the movement of the mobile identification transmitter, and precise position determination can be implemented with optimized power consumption.

It will be noted that the operation of the identification-transmitter control device STI just described can be seen not only as an option of the second embodiment, but also as an option of the first embodiment. This means that although the identification-transmitter control device STI prevents the transmission of response signals when the mobile identification transmitter IDG is in the stationary state, a change to the moving state can result in it automatically prompting the transmission of a signal containing the change of the state of motion.

It will be noted that it is also conceivable to implement a combination of the first and the second embodiment, in particular to the effect that the identification-transmitter control device STI responds to a first enquiry signal ANO after a stationary state is recognized by once again transmitting an applicable response signal containing the state of motion of the mobile identification transmitter IDG (and if appropriate a response signal AW1) in order to inform the on-vehicle control device STE about the stationary state of the mobile identification transmitter IDG, and then subsequently preventing the transmission of response signals while the mobile identification transmitter IDG is in the stationary state. With reference to FIG. 2, it is thus possible, as an option, for the signals transmitted at the time T3 to the then stationary mobile identification transmitter IDG to be received and evaluated by the latter. Only the first enquiry signal ANO since the stationary state was recognized results in the mobile identification transmitter IDG returning respective response signals AWO containing the information about a stationary state of the mobile identification transmitter and a response signal AW1 for the localization signal containing information about the field strength RS1 measured at the location of the mobile identification transmitter. These signals are then received and evaluated by the on-vehicle transmitting/receiving device SEF at the time T4. In this way, the on-vehicle control device STE then knows that the mobile identification transmitter is stationary and that the subsequent absence of a response is due to the stationary state. A distinction between a "stationary" state and a "communication disrupted" state is thus possible, as a result of which the security and reliability of the access device is increased.

Figure 5:
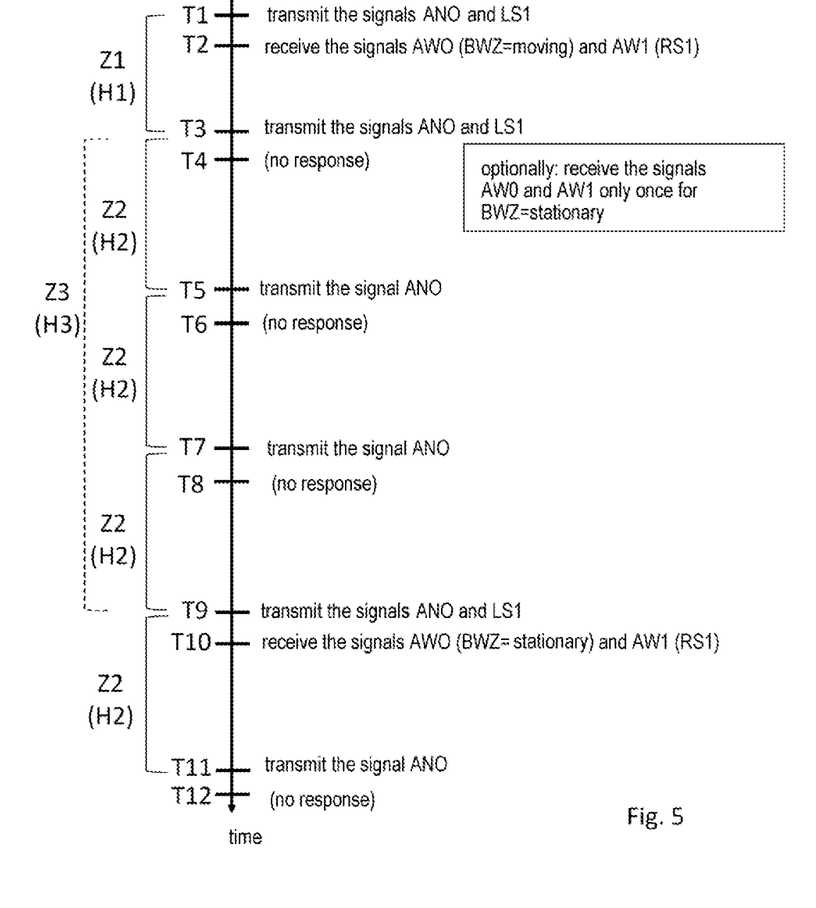
FIG. 5 shows a flowchart to illustrate the control of the transmission of enquiry signals on the basis of the movement of the mobile identification transmitter according to a fourth embodiment.

Reference will now be made to FIG. 5, which shows another flowchart to illustrate the control of the transmission of enquiry or localization signals according to a fourth embodiment. This fourth embodiment is very similar to the second embodiment and is intended to show an additional opportunity for the on-vehicle control device STE to be able to decide, in the absence of the response signals (for applicable enquiry signals ANO) from the mobile identification transmitter IDG, whether or not the key is in fact supposed to transmit a response signal again when a stationary state is recognized. The on-vehicle control device STE can transmit an applicable request to transmit a response signal at any one time. It is also conceivable for an applicable request to be issued after a specific time without a response signal or since a stationary state of the mobile identification transmitter was recognized.

In the figure, it is assumed that the mobile identification transmitter is stationary from the time T3. After the response signal AW0 containing the information that the mobile identification transmitter IDG is stationary has been received, a time interval Z3 begins to run with an assigned frequency H3. Since no response was received at the times T6 and T8, a request to the mobile identification transmitter to transmit applicable response signals again is issued at the time T9 (despite the stationary state of the mobile identification transmitter) when the enquiry signal ANO and localization signal LS1 are transmitted. As at or between the times T1 and T2, the enquiry signal ANO and localization signal LS1 are received, and a respective applicable response signal is generated and transmitted to the vehicle, which receives said response signal at the time T10. In this way, the on-vehicle control device STE can itself determine when it would like to check the presence or the location of the mobile identification transmitter, which means that reliable operation of the access device can be ensured even if there is a temporary absence of a response from the mobile identification transmitter.

A suitable mobile identification transmitter, besides an electronic vehicle key, is also another device that can be carried by a user and has appropriate described functionality, such as a mobile phone or smartphone, a tablet PC, a smartwatch, etc.

The invention claimed is:

1. An access device for a vehicle, comprising:
   an on-vehicle control device configured to transmit enquiry signals to a mobile identification transmitter to query state of motion thereof;
   wherein the on-vehicle control device is further configured to adapt the transmission of the enquiry signals for a response from the mobile identification transmitter containing the state of motion thereof or for the absence of the response;
   the mobile identification transmitter, the mobile identification transmitter comprising:
   a motion sensor for detecting a movement of the mobile identification transmitter,
   an identification-transmitter transmitting/receiving device configured to:
      receive the vehicle's enquiry signals, and
      transmit a response signal containing the state of motion of the mobile identification transmitter in response to at least one enquiry signal; and
   an identification-transmitter control device configured to control the transmission of the response signals;
   wherein the on-vehicle control device transmits to the mobile identification transmitter an enquiry signal, containing a request, at any one time or after a specific time interval has elapsed after a specific state of motion of the mobile identification transmitter has been recognized, which enquiry signal forces the mobile identification transmitter to return a response signal in any event.

2. The access device as claimed in claim 1, wherein the identification-transmitter control device is configured to enable the transmission of a response signal only when a specific state of motion exists.

3. The access device as claimed in claim 1, wherein the mobile identification transmitter further comprises:
   an identification-transmitter timing device for recording the time since a last predetermined movement of the mobile identification transmitter.

4. The access device as claimed in claim 1, wherein the identification-transmitter control device is further configured to:
   recognize the state of motion to be a stationary state of the mobile identification transmitter when detected movement is below a predetermined threshold value, and
   recognize the state of motion to be a moving state of the mobile identification transmitter when the detected movement is above a predetermined threshold value.

5. The access device as claimed in claim 3, wherein the identification-transmitter control device is further configured to recognize the state of motion of the mobile identification transmitter as a moving state when detected movement is above a predetermined threshold value and the time measured by the identification-transmitter timing device is within a predetermined time interval.

6. The access device as claimed in claim 1, wherein the on-vehicle control device is further configured to reduce frequency of the transmission of the enquiry signals when a stationary state has been received as the state of motion of the mobile identification transmitter.

7. The access device as claimed in claim 1, wherein the on-vehicle control device is further configured to reduce a data content or signal duration of the enquiry signals when a stationary state has been received as the state of motion of the mobile identification transmitter.

8. The access device as claimed in claim 6, wherein the on-vehicle control device is further configured to increase the frequency of the transmission of the enquiry signals again when, after a stationary state has been received as the state of motion of the mobile identification transmitter, a moving state has been received again.

9. The access device as claimed in claim 1, wherein the mobile identification transmitter automatically transmits a notification signal when it changes from a stationary to a moving state.

10. The access device as claimed in claim 1, wherein the on-vehicle control device is designed to authenticate the mobile identification transmitter by using at least one enquiry signal to transmit a request, and to receive a response signal from the mobile identification transmitter containing an identification code.

11. The access device as claimed in claim 1, wherein the on-vehicle control device transmits signals configure to determine position of the mobile identification transmitter as the enquiry signals or as separate localization signals.

12. The access device as claimed in claim 11, wherein localization signals for position determination are transmitted only when a moving state of the mobile identification transmitter is recognized.

13. The access device as claimed in claim 1, wherein the on-vehicle control device is further configured to trigger a predetermined vehicle function based on reception of a moving state of the mobile identification transmitter or position of the mobile identification transmitter relative to the vehicle or the reception of a valid identification code of the mobile identification transmitter, or if a specific combination of said criteria exists.

14. A vehicle having an access device as claimed in claim 1.

15. A method for operating an access device of a vehicle, comprising:
  at an on-vehicle control device:
    transmitting enquiry signals to a mobile identification transmitter to query state of motion thereof;
    adapting the transmission of the enquiry signals for a response signal received from the mobile identification transmitter containing the state of motion of the mobile identification transmitter, or based on the absence of the response signal; and
    emitting at any one time or after a specific time interval has elapsed after a specific state of motion of the mobile identification transmitter has been recognized an enquiry signal, which enquiry signal; at the mobile identification transmitter, forces the mobile identification transmitter to return a response signal in any event.

\* \* \* \* \*